(12) United States Patent
Quan, Jr. et al.

(10) Patent No.: US 7,752,223 B2
(45) Date of Patent: Jul. 6, 2010

(54) METHODS AND APPARATUS FOR VIEWS OF INPUT SPECIALIZED REFERENCES

(75) Inventors: Dennis A. Quan, Jr., Quincy, MA (US); Eric David Perkins, Boston, MA (US); Chetan R. Murthy, Cambridge, MA (US); Abraham S. Heifets, Cambridge, MA (US); Joseph J. Kesselman, Malden, MA (US); Moshe Morris Emanuel Matsa, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 153 days.

(21) Appl. No.: 11/500,587

(22) Filed: Aug. 7, 2006

(65) Prior Publication Data

US 2008/0034010 A1   Feb. 7, 2008

(51) Int. Cl.
*G06F 17/30* (2006.01)

(52) U.S. Cl. .................. 707/790; 791/802; 791/804; 791/808; 791/809

(58) Field of Classification Search ......... 707/790–791, 707/802–804, 808–809
See application file for complete search history.

(56) References Cited

U.S. PATENT DOCUMENTS 5,937,409 A * 8/1999 Wetherbee .................. 1/1
6,766,330 B1 * 7/2004 Chen et al. .................. 1/1

* cited by examiner

*Primary Examiner*—Jean M Corrielus
(74) *Attorney, Agent, or Firm*—Chapin IP Law, LLC

(57) ABSTRACT

A program specializer employs input specialized data structures by generating an input specialized definition of a set of data elements, and parsing an application program to identify data element references to data elements in the generated input specialized definitions of data elements. The program specializer replaces or rewrites the identified data element references with the corresponding input specialized definition. The input specialized data elements from the input specialized program are employed in a particular view by generating a mapping of source data types to preferred data types, such that the preferred data types have access advantages over the source data types, and receiving a markup application program having source data types operable to be modified in the input specialized program. A view mapper maps, using the generated mapping, a source data type to a preferred data type, and applies the mapped preferred data type to occurrences of the corresponding source data type.

17 Claims, 6 Drawing Sheets

Fig. 1

METHODS AND APPARATUS FOR VIEWS OF INPUT SPECIALIZED REFERENCES

BACKGROUND

In conventional XML based application, a typical first step in any XML processing is to read in an XML document from disk (or the network) into memory. Most of the standards for conventional XML processing operate on an abstract model of the document in which the document is modeled as a set of nodes linked together with two fundamental, bidirectional relationships, parent/child, and previous-sibling/next-sibling. Traversal of these linkages to locate specific nodes, is accomplished by QName (i.e. get the next sibling named "foo", or the first child named "bar"), as the conventional model is meant to be generalized for any XML vocabulary. Note that in most models, attributes are handled specially, and are not considered children—or siblings—because of their special, unordered semantics. The basic access pattern, however, remains the same. The W3C standard Document Object Model (DOM) provides a standard example of this model both in abstract, and in concrete implementation.

Traditionally, conventional processing of the Extensible Markup Language is based on a set of fairly general-purpose, off-the-shelf software components: a parser which understands XML syntax (and, often, applies basic data validation, following rules for this type of document as expressed in an XML Schema), an intermediate form for the XML dataset (such as a model accessed through the W3C DOM APIs, or a sequence of SAX events), and a serializer which will render the intermediate representation back into its XML-syntax equivalent. The actual application code, as is apparent to those of skill in the art, operates on the intermediate representation between its production by the parser and its delivery to the serializer.

The generality of such tools facilitates development, but has performance costs. For example, a parser which is designed for general-purpose use may spend a significant amount of time testing for input cases which are extremely unlikely to occur in a document conforming to a given schema.

SUMMARY

Conventional code optimization mechanisms such as optimized parsers attempt to generate code expressions for accessing data in a most efficient manner for the type of data represented. However, modern development languages such as markup languages have the capability to generate and access large, complex data structures via conventional sequences including list traversal and name matching. Such markup languages, while readily adaptable to a variety of information definitions, suffer from several shortcomings. Popular markup languages such as the Extensible Markup Language (XML), while providing flexible and powerful data representation mechanisms, tend to generate complex, dynamic data structures which may not be the most appropriate for all contexts. For example, a sequential operation for a fixed number of operands may be best served by an array, however periodic random access to an unknown number of elements may be more appropriate for a hash table.

The same is true for a generic dataset model such as a general-purpose DOM implementation; a complete representation of the conventional document may include a great deal of information that this particular application does not need to access. If the access patterns are known, the data structure can be optimized to better support them, for example by storing information in a hashtable rather than as a list of children. Similarly, large portions of the document may be entirely irrelevant, thus representing data references that may be optimized away.

In fact, even an optimized parser can represent unnecessary overhead. In the traditional model described above, to take advantage of conventional XML-based tooling, a developer first has the data represented as an XML-syntax character stream. In many real-world cases, especially for business processes, the data is originally in some other representation specific to the program which is producing or retrieving it. This means that we must pay the overhead of serializing it out from that representation into XML syntax, only to pay the costs of parsing it back into the representation which is native to the XML-based processor.

Various attempts have been made to streamline this, e.g. by using adapters to wrap an XML interface such as the DOM around this non-XML data or by rendering the data directly into a SAX stream which can be used to build the XML application's preferred representation—but these have involved either interpretive inefficiencies in the adapter layer, or memory inefficiencies in the process of recopying the data, or both.

Accordingly, configurations herein substantially overcome the shortcomings presented above by providing an abstract view mapping operable to map general data types, such as those from a DOM based definition, to a preferred data type better suited to the access patterns of the invoking code. The exemplary configurations employ input specialization with abstract view mapping to map from a target source data type to a preferred data type operable to provide more efficient or better suited access to the data at hand. The mapping is operable to inject particular observations or context specific knowledge about how the data is accessed or used, and provide a more appropriate or efficient manner of access. By parsing an XML application program employing such DOM based or input specialized target data types, configurations herein replace or rewrite the expression representing and referencing the data types to employ the preferred data types. Further, such optimizations may be further combined with input specialization techniques, such as those disclosed in copending U.S. patent application entitled "METHODS AND APPARATUS FOR INPUT SPECIALIZATION" and Ser. No. 11/501,216, filed concurrently and incorporated herein by reference. In this manner, the combination of view (data type) mapping and input specialization is applicable to XML implementations to effect more efficient access mechanisms and eliminate unnecessary complex pointer references and associated traversals.

All modern programming languages support some method for aggregating multiple pieces of data into a single unit of an aggregate type. Similarly mechanisms are supported for disaggregating the data items from the aggregate type. As the basis for our application of views, we define an abstraction of these capabilities where the aggregation method is referred to as a constructor, the disaggregation method is a referred to as a deconstruction match, and the resulting aggregate data type is referred to as a CDT. While the terminology we use for these operations derives from algebraic data types used in languages such as Haskell and OCaml, here we are using these terms as abstractions of operations available in all languages. Conjunctive aggregation of data items (as supported in C with structs, for example) is represented through the use of a single constructor. Disjunction among possible aggregations (as supported in c with unions) is represented with a CDT that has several constructor alternatives. The disaggregation operation is represented with a deconstruction match, in which a particular construction alternative may be disaggregated, and its various data items bound to variables for use in the program.

In further detail, the method of processing an XML application program using abstract view mappings with input specialized data structures as defined herein includes generating an input specialized definition of a set of data elements, and parsing an application program to identify data element references to data elements in the generated input specialized definitions of data elements. A data structure generator computes an input specialized definition corresponding to each of the identified references data element references, and a program specializer replaces or rewrites the identified data element references with the corresponding input specialized definition. Computing the input specialized definition includes determining an index for offset indirection, such as a fixed field in a C struct, therefore having offset references to members of the data element, such that the data element members are operable for indexed references by the resulting input specialized application program.

The input specialized data elements from the input specialized program are employed in a particular view by generating a mapping of source data types to preferred data types, such that the preferred data types have access advantages over the source data types, and receiving a markup application program having source data types operable to be modified in the input specialized program. A view mapper maps, using the generated mapping, a source data type to a preferred data type, and applies the mapped preferred data type to occurrences of the corresponding source data type. Depending on the particular configuration, a compiler or automated generation process may interpret the rules to define the mapping, or alternatively, manual code file development may provide the mapping.

Alternate configurations of the invention include a multiprogramming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips, field programmable gate arrays (FPGAs) or as an Application Specific Integrated Circuit (ASIC). The software or firmware or other such configurations can be installed onto the computerized device (e.g., during operating system or execution environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
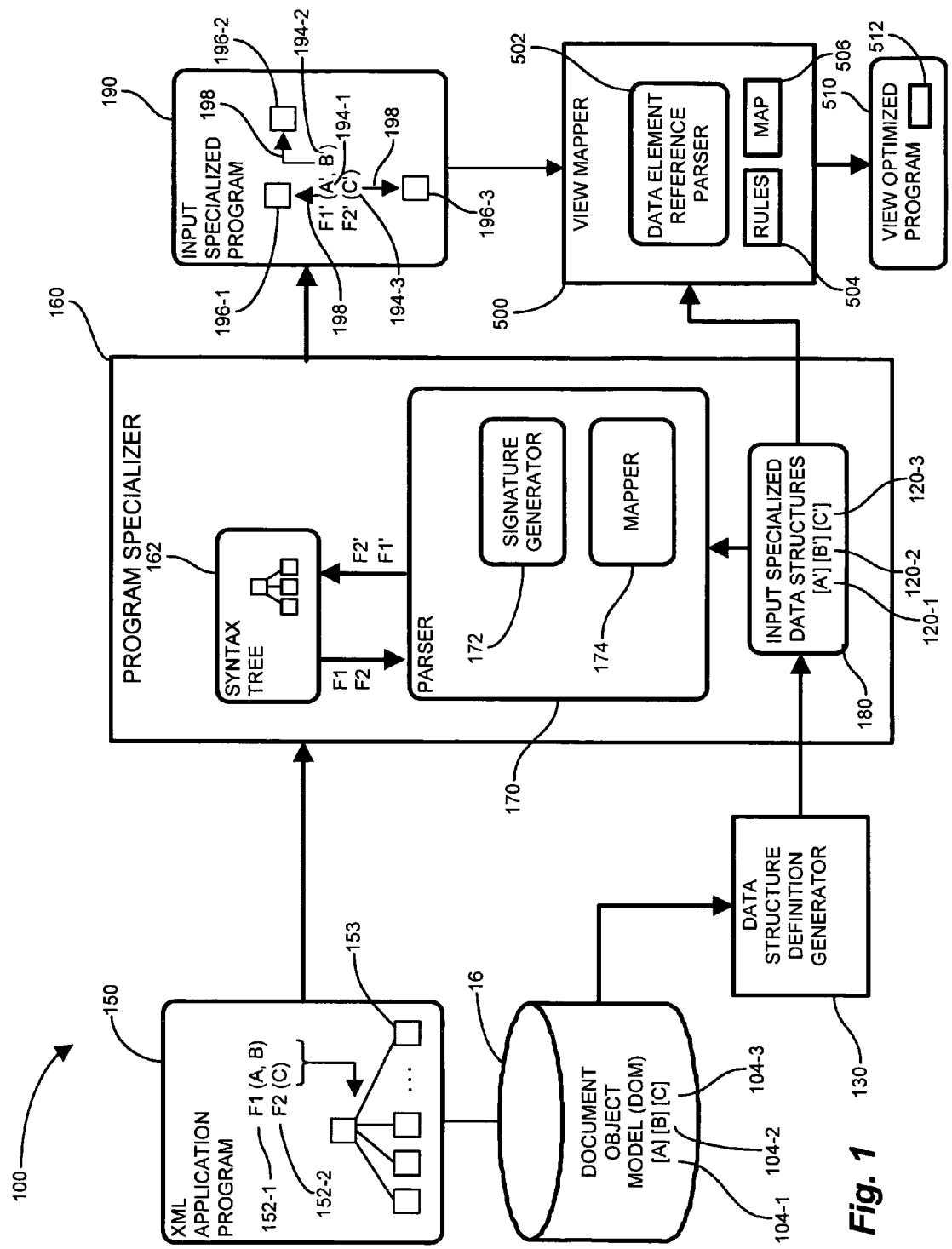
FIG. 1 is an exemplary XML environment suitable for use with the present configuration.

FIG. 1 is an exemplary XML environment 100 suitable for use with the present configuration. Referring to FIG. 1, an application program 150 employing DOM 104 based references is receivable by a program specializer 160. The application program 150 includes function invocations F1 and F2 152-1 . . . 152-2 respectively (152 generally), that include the data element references 104-1 . . . 104-3 for A,B and C, respectively. The program specializer 160 receives the application program 150 in an abstract syntax tree (AST) 162. Also employing the DOM 16 definitions is the data structure generator 130, that generates input specialized data structures 180 derived from the DOM definitions A,B and C (104). A parser 170 includes a signature generator 172 and a mapper 174.

The parser 172 processes the syntax tree 162 to identify function invocations F1 and F2 including data element references included in the input specialized data structures 180. The mapper 174 identifies the input specialized data structures A', B' and C' (120) corresponding to the data element references A, B and C 104 from the application program 150. The signature generator 172 employs the mapped data elements A' B' and C' to replace the function invocations F1 and F2 with the input specialized function references (signatures) F1' and F2' 192 in the output application program 190 including the input specialized calls 192. Accordingly, the input specialized data elements 194-1 . . . 194-3 are operable to access the corresponding data item 196-1 . . . 196-3 via a single offset indirection 198, thus avoiding an iteration of pointer references and name matching typically associated with DOM based references in an application program. The single offset indirection 198, therefore, provides an offset reference for the data item 196 referred to by the data element 194, in contrast to the potentially extended traversal of tree nodes 153 form traversing a DOM based data structure as in 104-1 . . . 104-3.

The input specialized program 190 is responsive to a view mapper 500 for replacing or rewriting the data element references 120 according to a map 506 of data types. Data element references 194 are receivable by the parser 502 for mapping to alternate views A set of rules 504 determines, for particular data types from the input specialized data structures 120, alternate view data structures 512. The map 506 maps the input specialized data structures 120 to the alternate view data structures 512 yielding a view optimized program 510.

Referring to the discussion on input specialization above, and as discussed further in the copending application cited above. As has been demonstrated in previous disclosures [1], if we know the schema(s) expected by this application (as is generally the case for business applications), we can use that information to automatically produce a parser and data structures optimized for the specific kinds of document to be processed, and therefore obtain considerable reductions in parse time. Paradoxically, the requirement that a parser perform the additional work to check that an XML document is a valid instance of a specific schema can actually reduce the total cost of reading the document.

Applying that same schema information to optimize the data model generated by the parser can likewise yield a more efficient solution, allowing us to store the data in a form which is more compact and can be manipulated more rapidly. This typically implies that we are able to alter the XML application to run against the new data structures, via an "input specialization" process, such as that discussed in the copending application cited above.

Configurations herein employ input specialization and abstract view mapping to show how information obtained from the user or extracted from an XSLT stylesheet can be used to further improve the efficiency of parsing and model construction. Also applied is the concept of view specialization to allow binding the now highly optimized application code directly to non-XML data structures, avoiding the need to generate and re-parse XML syntax while retaining all the advantages of working with the standardized XML abstractions.

The notion of input specialization has been shown to successfully map high-level XML processing programs to low-level data structures. This has been used to enhance the performance of XML processing programs, by eliminating both execution and memory costs of the rich data model used in XML processing languages such as XSLT. The same methods can also be used to reduce the same XML processing programs to the kinds of abstract data aggregation and disaggregation operations discussed above. By specializing to the CDT model, rather than the concrete physical structures used in previous applications of input specialization, we are able to apply the concept of views to XML processing. Such view concepts are well known in the art and are discussed further in Wadler, P. "Views: A way for pattern matching to cohabit with data abstraction." 14th ACM Symposium on Principles of Programming Languages, January 1987; Revised March 1987. Incorporated herein by reference.

The CDT model described above shares key similarities with the concrete structures used in regular input specialization. In particular, the data aggregations do not have any of the complex cross linkages present in the high-level XML data model, but rather have simple containment/aggregation relationships. This means that the same methods used to translate the high-level program to low-level physical data structures, map well onto the task of translating the same kinds of programs to the CDT model. So for example, where standard input specialization might, in an XSL program, map the evaluation of a child axis down to a direct access of a named member in a physical Java class, we may also use it to map the same child axis operation to a simple disaggregation, in which the named member of the aggregation is disaggregated and bound to a variable.

In order to drive this modified input specialization process then, we employ a mapping from the high-level type system (such as XML Schema) to the abstract data system of CDTs. This is a straight-forward extension of the known technologies that do this for C structs, Java classes, and other physical data types. Indeed, the abstract constructor/destructor model provides a powerful target for such a mapping because it more easily captures both conjunctive (For example XML Schema's "sequence" model) and disjunctive (For example, XML Schemas "choice" and "all" models) content. This is because a given CDT may have several construction options (constructors) which naturally model disjunction in the XML type system.

Once the original XML processing program has been specialized to the constructor/destructor model, The View concept may be then applied to further enhance performance with additional programmer-provided optimization strategies (as in the example of arrays vs. hashtables) or to retarget the processing platform off of serialized XML data already instantiated into preexisting business data structures.

Figure 2:
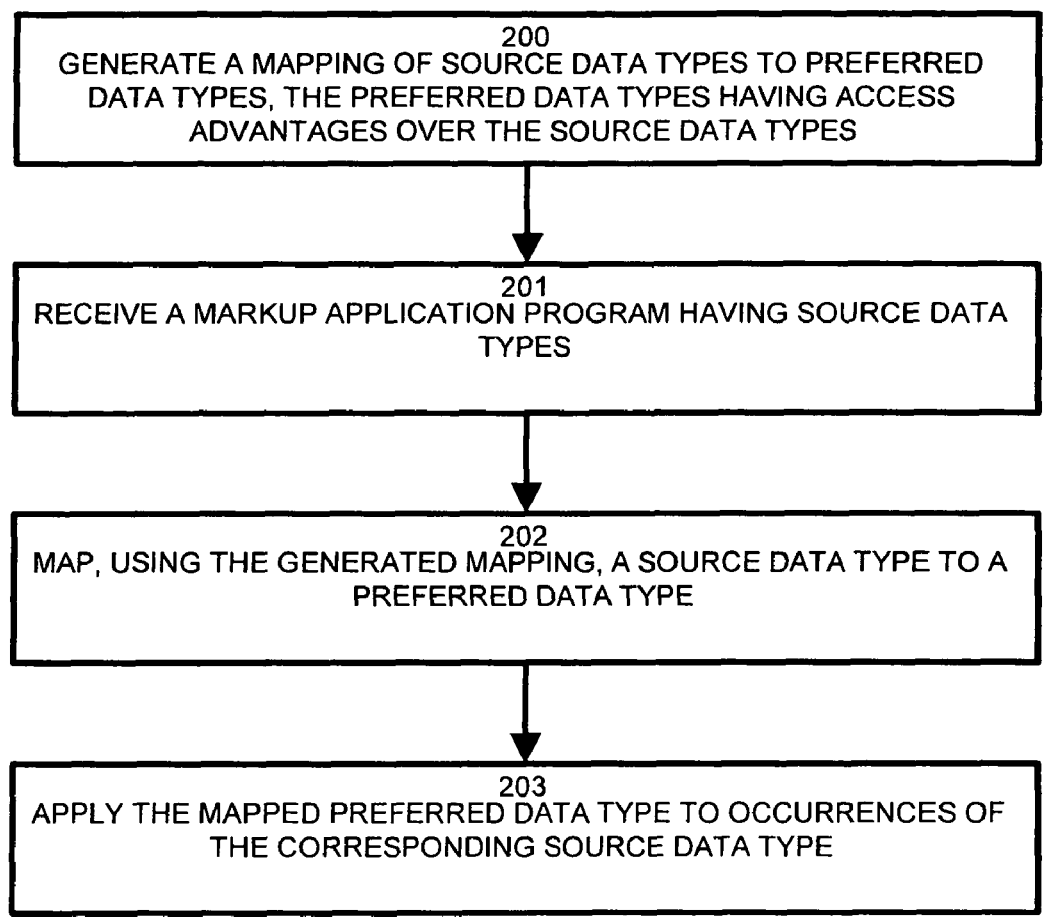
FIG. 2 is a flowchart of mapping in the environment of FIG. 1

FIG. 2 is a flowchart of mapping in the environment of FIG. 1. Referring to FIGS. 1 and 2, the method of representing computer parameter data as disclosed herein includes generating a mapping 506 of source data types 120 to preferred data types 512, such that the preferred data types 512 have access advantages over the source data types 120, as depicted at step 200, and receiving a markup application program 150 having source data types 104, as shown at step 201. A view mapper 500 maps, using the generated mapping 506, the source data type to a preferred data type, as depicted at step 202, and applies the mapped preferred data type to occurrences of the corresponding source data type, as shown at step 203

Configurations herein therefore provide a method to optimize a program's runtime data representation, aggregation, and extraction. The idea is that a compiler can accept a mapping from an abstract interface used by the client code to the actual target interface and automatically implant code that works against the target interface when calls are made against the abstract interface, eliminating the need for a translated copy to be computed and constructed at runtime.

In addition to the standard input files, the compiler takes a mapping descriptor from one interface to the other. This map consists of a list of types to be replaced. For each type, new code for data access and aggregation is specified. In languages lacking type inference, the resulting type must also be specified. After the compiler has built an in memory representation of an input program, and performed zero or more transformations, it applies this data rewriting pass. The compiler walks over the in memory program representation, checking each type reference, data access or data aggregation. If the types of these actions are in the mapping, the compiler substitutes the specified code. This process may be repeated until the compiler finds no types to substitute (in other words, reaching a fixpoint, when all changes have been performed). At this point, the compiler can continue with zero or more transformations, such as optimizations or code generation.

Figure 3:
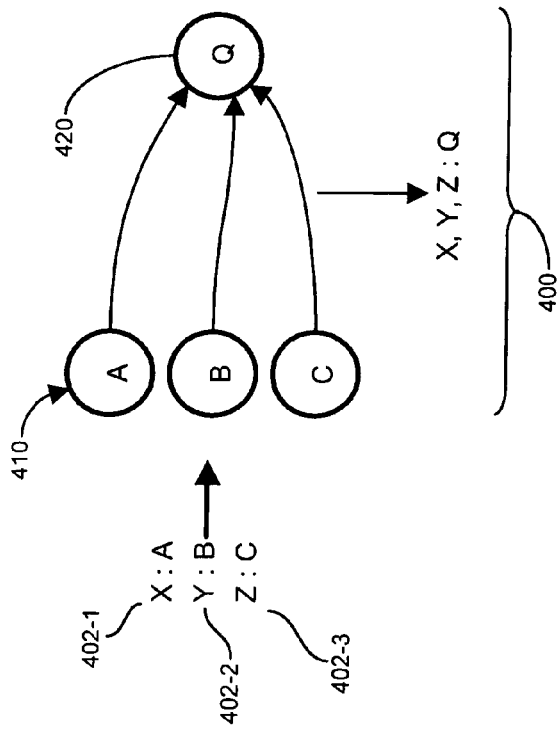
FIG. 3 is a diagram of type mapping as disclosed herein.

FIG. 3 is a diagram of type mapping as disclosed herein. Referring to FIG. 3, a mapping 400 includes source data types 410 and target data types 420. The mapping may take any suitable implementation form, such as a list, array or other sequence, however is shown as a digraph for exemplary purposes. Individual elements x, y and z (402-1 . . . 402-3) representing target, or source data types A, B and C (410-1 . . . 410-3, respectively) map to a corresponding target data type Q 420, that provides access more appropriate or suited to the processing context at hand. The mappings may be from one-many or many to one, usually depending on the aggregation or subdivision of the members of the respective data types. The resulting replaced or substitution code 430 represents the mapped preferred data type Q.

Figure 4:
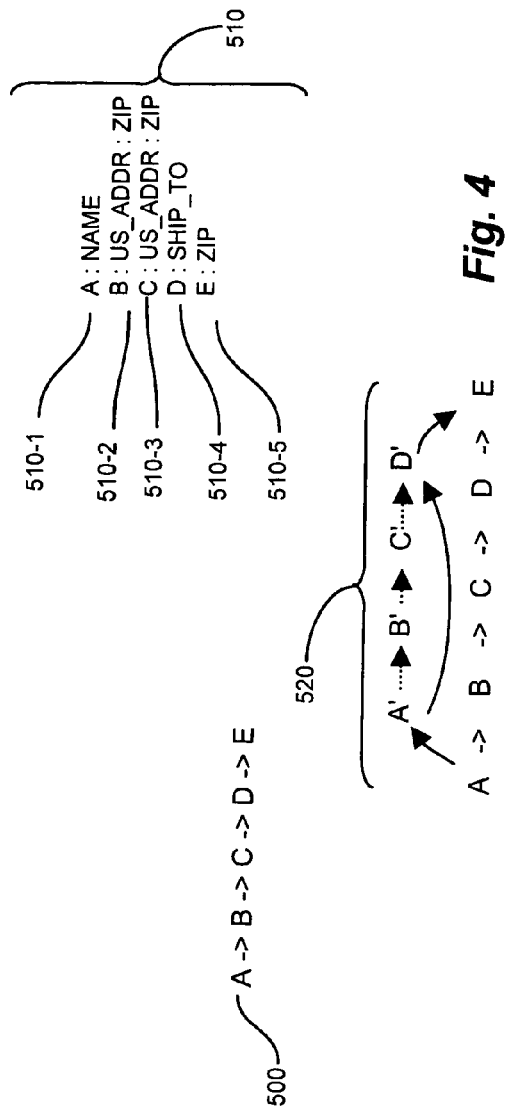
FIG. 4 is a flow diagram of rewriting a data access expression according to configurations herein.

FIG. 4 is a flow diagram of rewriting a data access expression according to configurations herein. Referring to FIG. 4, an exemplary access expression 500 is defines a purchase order shipping destination, and includes nested hierarchical types A, B, C, D and E. Referring to type definitions 510, definitions 510-2 and 510-3 are of type US address, which includes a zip field. However, member E 510-5 includes a stand alone zip field. Accordingly, B 510-2 and C 510-3 are redundant and unnecessary, since the zip is included in E 510-5 and the ship_to address is covered in D 510-4. The replacement access statement 520 shows that A' replaces A, and references B' and C', both no-ops, respectively, in light of duplicate coverage already provided by more specific members D and E. Substitution member (field) C' includes D', which references the original E 510-5 field.

For example, if there is some code which iterates over an array, checking for membership of some element, then an inlining operation could eliminate a call to the function which tests membership, but the array must still be created and each element, in turn, checked. The fact that the code is written to iterate over the array forces a linear scan to find elements taking time proportional to the number of elements (O(n)). Element membership runs faster against hashtables (expected constant time, O(1)), but no amount of inlining will transform a linear scan against an array into a hashtable lookup. Instead, the construction code, access code, and data aggregate types must all be changed en masse.

The above example of rewriting array-iteration backed membership tests as hashtable lookups is a simple example where performance can be improved via different data organization. However, the disclosed method is applicable beyond arrays and hashtables to general data structures. Where there are abstract data aggregation (setting elements in an array, for the above example) and access (such as array iteration or indexed element access, for the above example) these can be remapped into aggregations with different properties (such as adding entries to a hashtable, which permits fast lookup but slow ordered access). In addition to enumerable collections of data elements, construction and access of bound correlated groupings of data (structs in C or data wrapper objects such as Java Beans in Java) can be remapped. For example, a standard object example is a Cartesian Point, which contains an X and Y coordinate.

type point={x: int; y: int;}

A graph may contain an array of Points, which can be drawn on a screen. This data organization is convenient for programmer because the logical connection between the X and Y coordinates for each point is made clear. However, it also incurs a memory and performance cost: each Point object requires a memory representation and to access the coordinate data requires an indirection through the encapsulating Point object. With the VDT, we can specify that getting the coordinates for a point (a_point.x and a_point.y) should be materialized as accesses into parallel integer arrays (one storing the x coordinates and one storing the y coordinates), which avoids ever creating real Point objects.

CDTs are constructed with a construct operation and the member data is accessed via a deconstruction-match operation. Streams are decomposed either by selecting a particular stream-element or via iterate-ing (known as, in various traditions, map, for each, fold, and reduce) over every element in the stream.

For an CDT-based program to interface efficiently with, for example, an existing Java Object based data structure, such a program would need to be transformed, providing efficient Java operations for the construct, deconstruction-match, stream-element and iterate tasks. Iterate tasks may be translated into code based on Java java.util.iterators or into for(){ }statements iterating over Java arrays. Given such a mapping, the compiler could walk an CDT based program and transform each CDT reference to an equivalent Java data access.

Given an XML transforming program written in terms of access against an abstract data aggregation and an extant concrete instantiation of the data, we can apply views to translate between the logical abstraction and the existing data representation. This way, the compiler can generate efficient access code without the need for runtime translations.

For example, the following code fragment depicting an input-specialized program prints out the cost of all Items in a Purchase Order:

```
match po with po(items_list address total) in
   foreach item in items_list
   do
      match item with item(name, id, cost) in
      print cost
   done
```

The following code fragment depicting view definition maps the abstract aggregations to a pre-existing Java Beans object tree.

```
view po ::= com.example.PO
get_items_list_from_PO(po) ::= po.get_items_list( )
view items_list ::= java.util.List
foreach item in items_list do ::=
   java.util.Iterator i = items_list.iterator( );
   while(i.hasNext( ) {
   Item item = (Item)(i.next( ));
foreach item in items_list done ::= }
view item ::= com.example.Item
get_cost_from_item(item) ::= item.get_cost( )
```

By replacing the types and accessors for each aggregate datatype with the specified types, we can run the input-specialized program against existing data structures:

```
Java.util.List items_list = po.get_items_list( );
java.util.Iterator i = items_list.iterator( );
while(i.hasNext( ) {
   Item item = (Item)(i.next( ));
   int cost = item.get_cost( );
   print cost;
}
```

Figure 5:
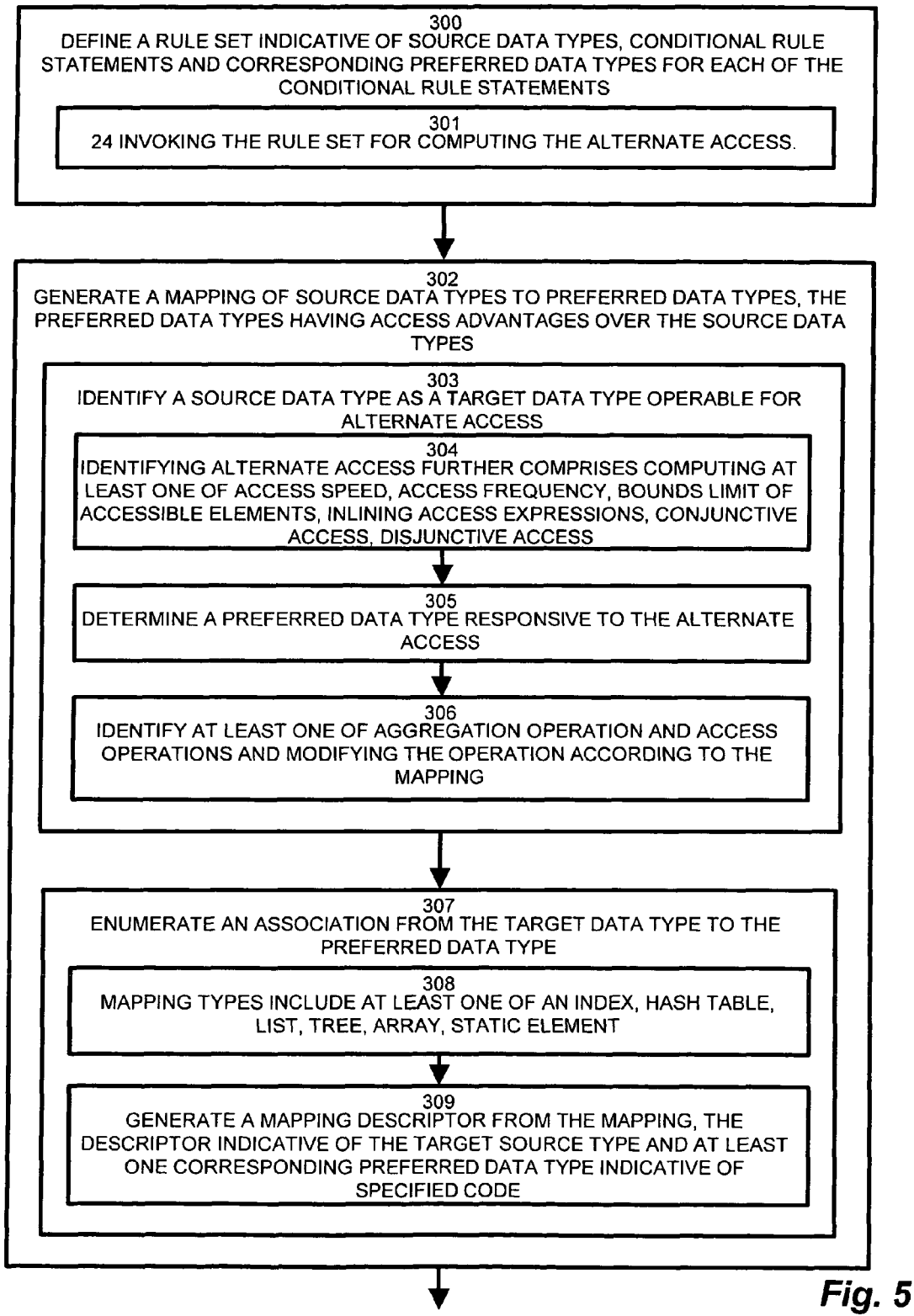
FIGS. 5-7 are a flowchart of application program optimization as disclosed herein.
Figure 6:
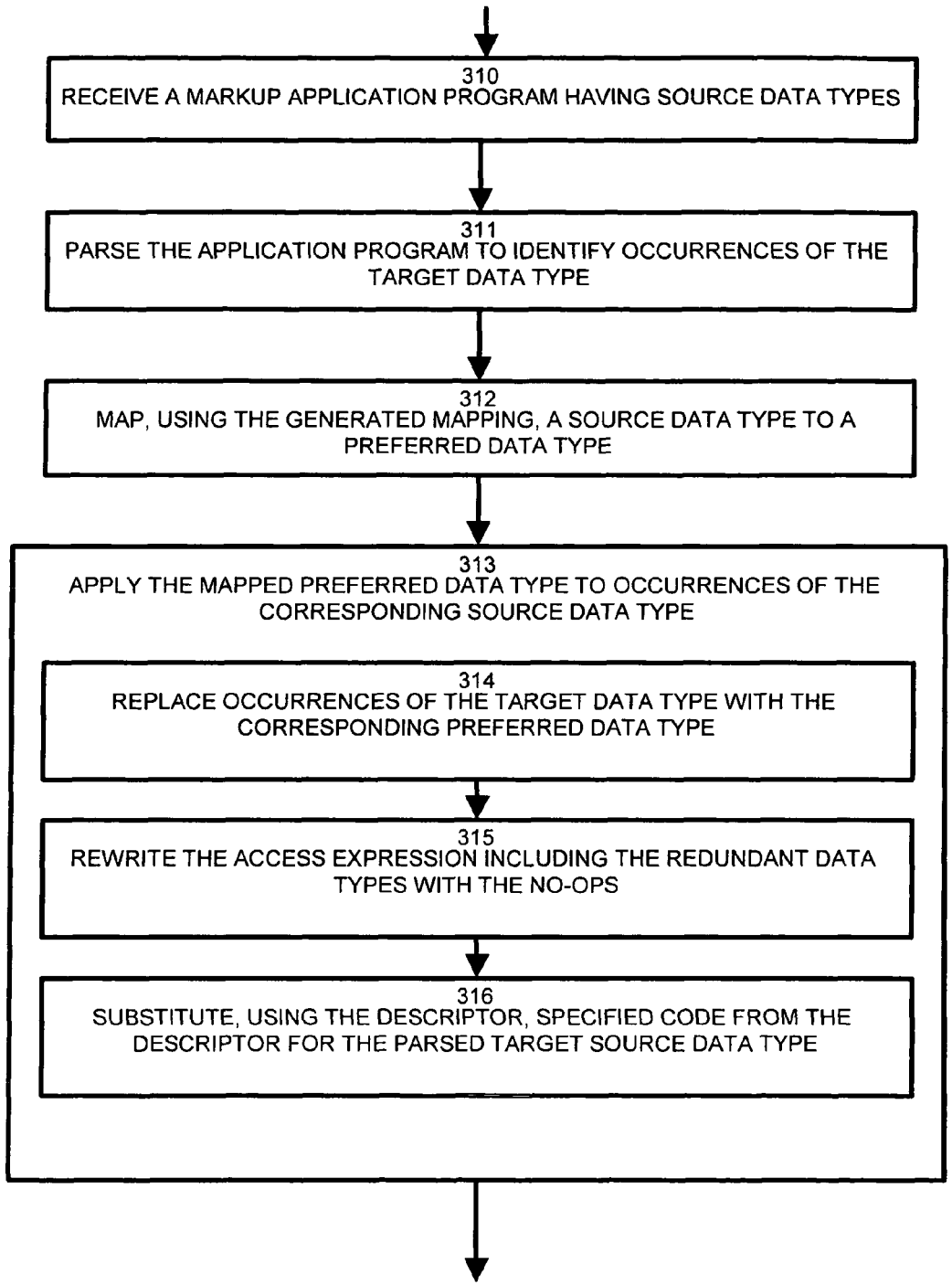
Figure 7:
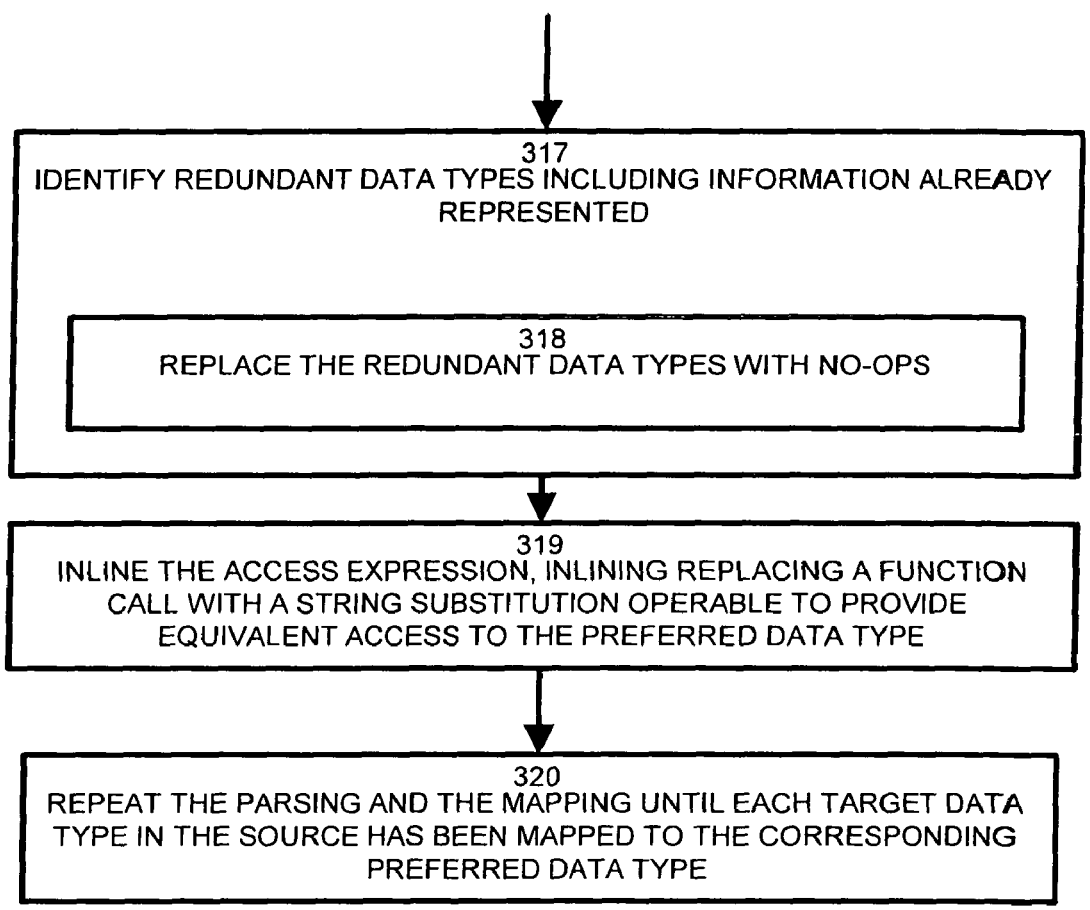

FIGS. 5-7 are a flowchart of application program optimization as disclosed herein. Referring to FIGS. 4-7, in an exemplary arrangement, the method disclosed herein defines a rule set 504 indicative of source data types 120, conditional rule statements and corresponding preferred data types for each of the conditional rule statements, as shown at step 300, and invoking the rule set 504 for computing the alternate access, as depicted at step 301. Using the rule set 504, the view mapper 500 generates a mapping 506 of source data 120 types to preferred data types 512, such that the preferred data types have access advantages over the source data types, as shown at step 302.

Generating the map 506 includes identifying a source data type 120 as a target data type 410 operable for alternate access, as shown at step 303. This typically involves computing at least one of access speed, access frequency, bounds limit of accessible elements, inlining access expressions, conjunctive access, and disjunctive access, as discussed above, shown at step 304. The result is determination of a preferred data type responsive to the alternate access, as depicted at step 305. Computing alternate access may further include identifying at least one of aggregation operation and access operations and modifying the operation according to the mapping, as shown at step 306.

The resulting map 506 enumerates an association from the target data type to the preferred data type, as shown at step 307. Typical mapping types include at least one of an index, hash table, list, tree, array, and static element, which include the types that are replaceable with others of these types depending on the type affording optimal access, as depicted at step 308. In the exemplary arrangement, generating the mapping further include generating a mapping descriptor from the mapping, in which the descriptor is indicative of the target source type 120 and at least one corresponding preferred data type 512 indicative of specified code, as depicted at step 309.

Following definition of the map 506, the view mapper 500 receives a markup application program 190 having source data types, as disclosed at step 310. In the exemplary arrangement, the markup application program 190 has already been input specialized from an XML application program 150 including DOM derived data elements 104. Applying the preferred data types further includes, as depicted at step 311, parsing the application program to identify occurrences of the target data type 120. The data element reference parser 502 maps, using the generated mapping 506, each of the occurrences of the source data types 410 to a preferred data type 420, as shown at step 312.

The data element reference parser 502 then applies the mapped preferred data type 420 to occurrences of the corresponding source data type 410, as depicted at step 313. This involves, at step replacing occurrences of the target data type with the corresponding preferred data type, as shown at step 314. In the exemplary configuration, this may involves rewriting the access expression 410 including the redundant data types with the no-ops, as shown at step 315. At step 316, the data element reference parser 316 substitutes, using the descriptor, specified code from the descriptor for the parsed target source data type 410, as depicted at step 316.

In the exemplary arrangement, mapping of source data types 410 to preferred data types 420 may further include identifying redundant data types including information already represented, as shown at step 317, and replacing the redundant data types with no-ops, as disclosed at step 318.

Rewriting the access expression may further includes inlining the access expression, such that inlining replaces a function call with a string substitution operable to provide equivalent access to the preferred data type, as depicted at step 319. The view mapper 500 repeats the parsing and the mapping until each target data type 410 in the source has been mapped to the corresponding preferred data type 420, as shown at step 320.

The disclosed configurations may result in large amounts of new code, some parts of which are repetitive, some parts of which have dangling references, and many parts of which can be optimized. Configurations herein optimize this code using partial evaluation in order to bring the code size back down to the approximate size it was prior to input specialization and view mapping.

Those skilled in the art should readily appreciate that the programs and methods for processing markup data using alternate views of an input specialized data structure as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The disclosed method may be in the form of an encoded set of processor based instructions for performing the operations and methods discussed above. Such delivery may be in the form of a computer program product having a computer readable medium operable to store computer program logic embodied in computer program code encoded thereon, for example. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for processing markup data using alternate views of an input specialized data structure has been particularly shown and described with references to embodiments thereof, it will be understood by those skilled in the art that various changes in form and details may be made therein without departing from the scope of the invention encompassed by the appended claims.

What is claimed is:

1. A computer-implemented method for performing a method of representing computer parameter data in which a computer system performs operations comprising:
   receiving a markup application program having source data types;
   generating a mapping of the source data types to preferred data types,
      identifying a source data type as a target data type operable for alternate access;
      determining a preferred data type responsive to the alternate access;
      enumerating an association from the target data type to the preferred data type;
   the preferred data types having access advantages over the source data types;
   mapping, using the generated mapping, the source data types to the preferred data types;
   applying the mapped preferred data type to occurrences of the corresponding source data type;
   parsing the application program to identify occurrences of the target data type; and
   replacing occurrences of the target data type with the corresponding preferred data type to generate a view optimized program.

2. The method of claim 1 wherein the mapping of source data types to preferred data types further comprises:
   identifying redundant data types including information already represented;
   replacing the redundant data types with no-ops; and
   rewriting an access expression including the redundant data types with the no-ops.

3. The method of claim 2 wherein rewriting the access expression further includes inlining the access expression, inlining replacing a function call with a substitution operable to provide equivalent access to the preferred data type.

4. The method of claim 3 further comprising repeating the parsing and the mapping until each target data type in the source has been mapped to the corresponding preferred data type.

5. The method of claim 4 wherein mapping types include at least one of:
   an index;
   a hash table;
   a list, tree;
   an array; and
   a static element.

6. The method of claim 1 wherein generating the mapping further comprises:
   generating a mapping descriptor from the mapping, the descriptor indicative of the target source type and at least one corresponding preferred data type indicative of specified code; and
   substituting, using the descriptor, specified code from the descriptor for the identified target source data type.

7. The method of claim 6 wherein identifying alternate access further comprises computing at least one of access speed, access frequency, bounds limit of accessible elements, inlining access expressions, conjunctive access, disjunctive access.

8. The method of claim 7 wherein computing alternate access further comprises identifying at least one of aggregation operation and access operations and modifying the operation according to the mapping.

9. The method of claim 8 further comprising
   defining a rule set indicative of source data types, conditional rule statements and corresponding preferred data types for each of the conditional rule statements; and
   invoking the rule set for computing the alternate access.

10. The method of claim 1 wherein generating a mapping of source data types further includes interpreting rules according to an encoded set of instructions operable to interpret the rules in view of the input specialized data types.

11. The method of claim 1 wherein generating a mapping further comprises using code file development to provide enumeration of available preferred data types.

12. The method of claim 1 wherein the view optimized program is then optimized via partial evaluation in order to reduce code size down to a similar size as the markup application program.

13. The method of claim 1 wherein the preferred data types differ structurally from corresponding source data types to provide speedier access.

14. The method of claim 1 wherein the access advantages are speed advantages.

15. A computer readable storage medium having computer readable instructions thereon for representing computer parameter data, the medium including instruction in which a computer system performs operations comprising:
   generating an input specialized definition of a set of data elements;
   parsing an application program to identify data element references to data elements in the generated input specialized definitions of data elements;
   computing an input specialized definition corresponding to each of the identified references data element references;
   replacing the identified data element references with the corresponding input specialized definition;
   generating a mapping of source data types in the replaced input specialized definitions to preferred data types, the preferred data types having access advantages over the source data types;
   mapping, using the generated mapping, the source data type to the preferred data type; and
   applying the mapped preferred data type to occurrences of the corresponding source data type.

16. A view mapper comprising an a computer readable storage medium having computer readable instructions thereon for defining views of input specialized data structures, the medium including instruction in which a computer system performs operations comprising:
   a set of rules for generating mapping of source data types to preferred data types, the preferred data types having access advantages over the source data types;
   a parser operable to receive a markup application program having source data types, the parser operable to:
      map, using the generated mapping, the source data types to the preferred data types; and
      apply the mapped preferred data type to occurrences of the corresponding source data type, the view mapper responsive to the rules and operable to generate the map by:
         identifying a source data type as a target data type operable for alternate access;
         determining a preferred data type responsive to the alternate access; and
         enumerating an association from the target data type to the preferred data type.

17. A computer program product having a computer readable medium operable to store computer program logic embodied in computer program code encoded thereon for defining views of input specialized data structures in which a computer system performs operations comprising:
   generating an input specialized definition of a set of data elements;
   parsing an application program to identify data element references to data elements in the generated input specialized definitions of data elements;
   computing an input specialized definition corresponding to each of the identified references data element references;
   replacing the identified data element references with the corresponding input specialized definition;
   generating a mapping of source data types in the replaced input specialized definitions to preferred data types, the preferred data types having access advantages over the source data types;
   mapping, using the generated mapping, the source data type to the preferred data type; and
   applying the mapped preferred data type to occurrences of the corresponding source data type,
   wherein the mapping of source data types comprising:
      identifying a source data type as a target data type operable for alternate access;
      determining a preferred data type responsive to the alternate access; and
      enumerating an association from the target data type to the preferred data type.

* * * * *